(12) United States Patent
Li et al.

(10) Patent No.: US 11,650,910 B2
(45) Date of Patent: May 16, 2023

(54) AUTOMATED TESTING METHOD AND APPARATUS, STORAGE MEDIUM AND ELECTRONIC DEVICE

(71) Applicant: NETEASE (HANGZHOU) NETWORK CO., LTD., Hangzhou (CN)

(72) Inventors: Xiang Li, Hangzhou (CN); Jianjun Wang, Hangzhou (CN); Xin Liu, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 124 days.

(21) Appl. No.: 16/956,641

(22) PCT Filed: Nov. 16, 2018

(86) PCT No.: PCT/CN2018/116018
§ 371 (c)(1),
(2) Date: Jun. 22, 2020

(87) PCT Pub. No.: WO2019/144681
PCT Pub. Date: Aug. 1, 2019

(65) Prior Publication Data
US 2020/0409830 A1 Dec. 31, 2020

(30) Foreign Application Priority Data
Jan. 23, 2018 (CN) .......................... 201810062053.4

(51) Int. Cl.
*G06F 9/50* (2006.01)
*G06F 11/36* (2006.01)

(52) U.S. Cl.
CPC .............................. *G06F 11/3688* (2013.01)

(58) Field of Classification Search
CPC ............. B60W 40/10; B60W 2300/14; B60W 2520/22; G01P 13/00; B60D 1/58; G01D 5/00
See application file for complete search history.

(56) References Cited

U.S. PATENT DOCUMENTS 5,600,789 A * 2/1997 Parker ................ G06K 13/0825
714/38.11
2008/0155515 A1 6/2008 Stewart
(Continued)

FOREIGN PATENT DOCUMENTS

CA 2346622 A1 11/2001
CN 101630286 A 1/2010
(Continued)

OTHER PUBLICATIONS

The ISR dated Feb. 11, 2019, from application No. PCT/CN2018/116018.
(Continued)

*Primary Examiner* — Mohamed Charioui
*Assistant Examiner* — Christine Y Liao
(74) *Attorney, Agent, or Firm* — Qinghong Xu

(57) ABSTRACT

An automated testing method and apparatus relate to the technical field of software test. The automated testing method includes: configuring a common Software Development Kit (SDK) interface and a Basic SDK model, and receiving a to-be-tested script comprising control information data and an operation type by using the SDK interface; performing a standardization process on the control information data using the SDK basic model to obtain a standard data structure; and running the to-be-tested script according to the operation type, and positioning a to-be-tested control in the to-be-tested script according to the standard data structure.

18 Claims, 11 Drawing Sheets

(56) References Cited

U.S. PATENT DOCUMENTS

| | | | |
|---|---|---|---|
| 2013/0067281 A1 | 3/2013 | Lee et al. | |
| 2017/0192883 A1* | 7/2017 | Yuan | G06F 11/3688 |
| 2017/0316123 A1 | 11/2017 | Xu et al. | |
| 2019/0095476 A1* | 3/2019 | Wahl | G06F 16/282 |

FOREIGN PATENT DOCUMENTS

| | | |
|---|---|---|
| CN | 103336742 A | 10/2013 |
| CN | 105988934 A | 10/2016 |
| CN | 106033387 A | 10/2016 |
| CN | 106095666 A | 11/2016 |
| CN | 108280026 A | 7/2018 |

OTHER PUBLICATIONS

The CN1OA dated Oct. 12, 2018, from application No. 201810062053.4.

The CNNOA dated Feb. 19, 2019, from application No. 201810062053.4.

\* cited by examiner

01# AUTOMATED TESTING METHOD AND APPARATUS, STORAGE MEDIUM AND ELECTRONIC DEVICE

This application is based on and claims priority of International Application No. PCT/CN2018/116018, filed Nov. 16, 2018, which is based upon and claims priority to Chinese Patent Application 201810062053.4, filed Jan. 23, 2018, the entire contents of which are incorporated herein by reference.

TECHNICAL FIELD

The present disclosure relates to software testing technologies, and in particular, to an automated testing method, an automated testing device, a computer-readable storage medium and an electronic device.

BACKGROUND

Existing game testing methods generally includes the following two test methods. One method includes the following steps: using a game test framework based on image recognition and corresponding script generation tool, a screenshot of the position to be operated and an operation type are recorded in the to-be-tested script, and when running the to-be-tested script, the position to be operated is located through the screenshot of the position, and the operation type corresponding to the to-be-tested script is executed to test the game script. Another method includes the following steps: based on a UI control identification method, all the UI control data in the game can be directly obtained (and attributes such as absolute position can also be obtained), the UI control you want to operate can be directly found out from the data, corresponding operation is performed on the UI control for the purpose of accurate automated testing operations.

It should be noted that the information disclosed in the background section above is only used to enhance the understanding of the background of the present disclosure, and therefore may include information that does not constitute the prior art known to those skilled in the art.

SUMMARY

An objective of the present disclosure is to provide an automated testing method, an automated testing device, a computer-readable storage medium, and an electronic device, so as to overcome, at least to some extent, one or more problems caused by limitations and defects in the related arts.

According to an aspect of the present disclosure, there is provided an automated testing method, comprising:

configuring a common Software Development Kit (SDK) interface and a Basic SDK model, and receiving a to-be-tested script comprising control information data and an operation type by using the SDK interface;

performing a standardization process on the control information data using the SDK basic model to obtain a standard data structure; and running the to-be-tested script according to the operation type, and positioning a to-be-tested control in the to-be-tested script according to the standard data structure.

According to an exemplary embodiment of the present disclosure, the Basic SDK model comprises more than one of an abstract model for a control node, an abstract model for control node dump, an abstract model for control node positioning and an abstract model for default matching.

According to an exemplary embodiment of the present disclosure, performing a standardization process on the control information data using the SDK basic model to obtain a standard data structure, comprises:

dumping control node data and control node hierarchy of the control information data according to a preset data format using the abstract model for control node dump, so as to obtain the standard data structure.

According to an exemplary embodiment of the present disclosure, positioning a to-be-tested control in the to-be-tested script according to the standard data structure comprises:

abstracting dimensions of the standard data structure into a feature attribute dimension, a space position attribute dimension and a grouped path attribute dimension; and combining the feature attribute dimension, the space position attribute dimension and the grouped path attribute dimension to obtain to-be-tested control matching data; and positioning the to-be-tested control in the to-be-tested script according to the to-be-tested control matching data.

According to an exemplary embodiment of the present disclosure, the feature attribute dimension, the space position attribute dimension and the grouped path attribute dimension are combined in a combination manner which comprises one or more of logical conjunction, logical disjunction, and logical negation.

According to an exemplary embodiment of the present disclosure, after the feature attribute dimension, the space position attribute dimension and the grouped path attribute dimension are combined to obtain the to-be-tested control matching data, the automated testing method further comprises:

normalizing the space position attribute dimension.

According to an exemplary embodiment of the present disclosure, normalizing the space position attribute dimension, comprises:

performing a quotient operation on an abscissa in the space position attribute dimension and a width value of a screen resolution of a display device to obtain a standard abscissa; and performing a quotient operation on an ordinate in the space position attribute dimension and a height value of the screen resolution of the display device to obtain a standard ordinate.

According to an exemplary embodiment of the present disclosure, positioning the to-be-tested control in the to-be-tested script according to the to-be-tested control matching data comprises:

traversing to-be-tested software corresponding to the to-be-tested script according to the to-be-tested control matching data; and returning the to-be-tested control which complies with the to-be-tested control matching data according to a traverse result.

According to an exemplary embodiment of the present disclosure, the automated testing method further includes:

configuring an analog input interface; and receiving a touch operation using the analog input interface, and controlling the to-be-tested control according to the touch operation.

According to an exemplary embodiment of the present disclosure, the automated testing method further includes:

configuring a script writing assistance tool, and generating a log corresponding to the to-be-tested script using the script writing assistance tool.

According to another aspect of the present disclosure, there is provided an automated testing device, comprising:

a configuration module configured to configure a common Software Development Kit (SDK) interface and a Basic SDK model, and receiving a to-be-tested script comprising control information data and an operation type by using the SDK interface;

a standardization process module configured to perform a standardization process on the control information data using the SDK basic model to obtain a standard data structure; and a to-be-tested control positioning module configured to run the to-be-tested script according to the operation type, and position a to-be-tested control in the to-be-tested script according to the standard data structure.

According to another aspect of the present disclosure, there is provided a computer-readable storage medium having stored thereon computer programs which, when executed by a processor, implement the automated testing method according to the above aspect.

According to another aspect of the present disclosure, there is provided an electronic device, comprising:

a processor; and a memory for storing instructions executable by the processor;

wherein when the instructions are executed by the processor, the processor is caused to implement the automated testing method according to the above aspect.

It should be understood that the above general description and the following detailed description are merely exemplary and explanatory, and should not limit the present disclosure.

BRIEF DESCRIPTION OF THE DRAWINGS

The drawings herein are incorporated in and constitute a part of the specification, illustrate embodiments consistent with the present disclosure, and together with the description serve to explain the principles of the present disclosure. Obviously, the drawings in the following description are only some embodiments of the present disclosure. For those of ordinary skill in the art, other drawings can be obtained based on these drawings without departing from the spirit of the present disclosure.

DETAILED DESCRIPTION

Figure 1:
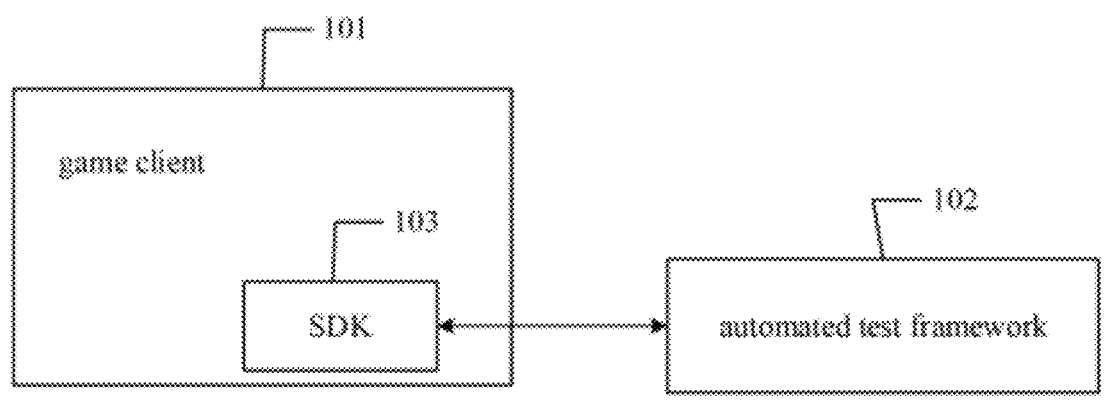
FIG. 1 is a schematic block diagram showing principles of automated testing.

Example embodiments will now be described more fully with reference to the accompanying drawings. However, the exemplary embodiments can be implemented in various forms and should not be construed as limited to the examples set forth herein; rather, providing these embodiments makes the present disclosure more comprehensive and complete, and conveys the concepts of the exemplary embodiments comprehensively to those skilled in the art. The described features, structures, or characteristics may be combined in any suitable manner in one or more embodiments. In the following description, numerous specific details are provided to give a full understanding of the embodiments of the present disclosure. However, those skilled in the art will realize that the technical solutions of the present disclosure may be practiced with omitting one or more of the specific details, or other methods, components, devices, steps, and so on may be adopted. In other cases, well-known technical solutions are not shown or described in detail to avoid obscure aspects of the present disclosure.

In addition, the drawings are merely schematic illustrations of the present disclosure and are not necessarily drawn to scale. The same reference numerals in the drawings represent the same or similar parts, and thus repeated descriptions thereof will be omitted. Some block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

The terms "a", "an", "the" and "said" are used to indicate the presence of one or more elements/components and so on. The terms "include" and "have" are used to mean open-ended inclusion, and for example, these terms may mean that there can be other elements/components and so on in addition to the listed elements/components and so on. The terms "first" and "second" or the like are only used to distinguishing different objects, rather than limiting the number of the objects.

The existing testing methods have many defects.

In the first testing method, the defects are: in some complex image recognition scenarios, the image recognition positioning is not accurate enough, which often causes running of the test script to fail.

In the second testing scheme, the defects are as follows. On the one hand, the usage scope of each automated test framework is small. On the other hand, the speed of obtaining the information of the control to be tested is slow and the abstraction of the obtaining method is not enough. Further, the coordinate system of the control to be tested is not flexible enough. Also, there is a relatively small number of supported analog input methods, and the auxiliary tools are relatively crude and inefficient.

Thus, a new automated testing method is needed.

In an automated testing scheme, data of all UI (i.e., User Interface, a graphical representation available to a user for interaction; the interface can include multiple controls) controls in the game can be directly obtained, and then the UI control to be operated can be directly searched from the data of controls, and then corresponding operations are performed on the control to complete accurate animation test operation. Further, in the automated test scheme, a UI tree presentation and picking function for a device to provide images, as well as functions of automatically generating and running a corresponding test script and generating a report, are provided.

The UI-based automated testing method will be further described below. The platforms that UI automation can be applied to include the Android platform, the IOS platform, the Windows platform, and other general platforms. The rendering of applications on the above platforms can be taken over by an operating system, that is, the applications are responsible for the style management and interaction logic for the controls, and the operating system is responsible for displaying these controls on the screen. Further, the automated framework communicates with the operating system to obtain control information (including control properties and interface layout, and the like) from corresponding interfaces. After having the information, when the automated test script is run, manual operations can be simulated, the effect of automated operations can be achieved, and finally the automated test can be completed.

Further, the UI rendering of the Web platform is independent of the operating system, and the structure and principle are much the same as those of the operating system. The Web page is responsible for managing controls and the browser is responsible for rendering. The automated framework can interact with the Web page through browser interaction to obtain the control information in the web page (interface) directly.

Because of the existence of a game engine, games and other applications behave very differently. Generally speaking, the game engine is responsible for both control management and rendering, while the rendering of other applications can be handled directly by the operating system. As a result, what the game presents before a user is a series of continuous rendered pictures, just like continuous pictures of a movie, the control information in the game cannot be obtained directly through the operating system. In this case, if you need to obtain control information from the game, you can only communicate with the game. Of course, the control management and rendering methods of different game engines are different, so the current automated frameworks of different engines also vary.

The bigger problem is that, for security reasons, game engines are generally not openly reserved for automated test interfaces. Most engines are not open source or even open. At present, there is basically no common UI automated test framework for game engines.

Further, the general principles of the UI automated framework for each game are similar. Here, the existing test tools are used as an example to explain the specific process of using the framework to perform test.

Referring to FIG. 1, a SDK 103 needs to be embedded in game client 101, that is, a special code module is put into a game script and run together with the game script. The SDK 103 obtains real-time control information of the game through the internal interface of the game engine when the SDK 103 is run. The automated test framework 102 communicates with the SDK 102 outside the game to obtain the control information. The control information includes the basic elements such as the position, size, text, and name of the control. Further, the automated test may include the following operations:

Simulation operation: The test tool can generate a simulation operation, such as a simulated click at this position, to achieve the effect of clicking this control.

Analog input: Because the test tool directly uses the adb command to generate an analog input, it is only applicable to games on the Android platform.

Locating Controls: The test tool also provides APIs to obtain the controls, the controls can be obtained by attributes such as name, path, text, and wildcard path matching is also supported, such as obtaining a descendant node in a descendant of a node.

Figure 2:
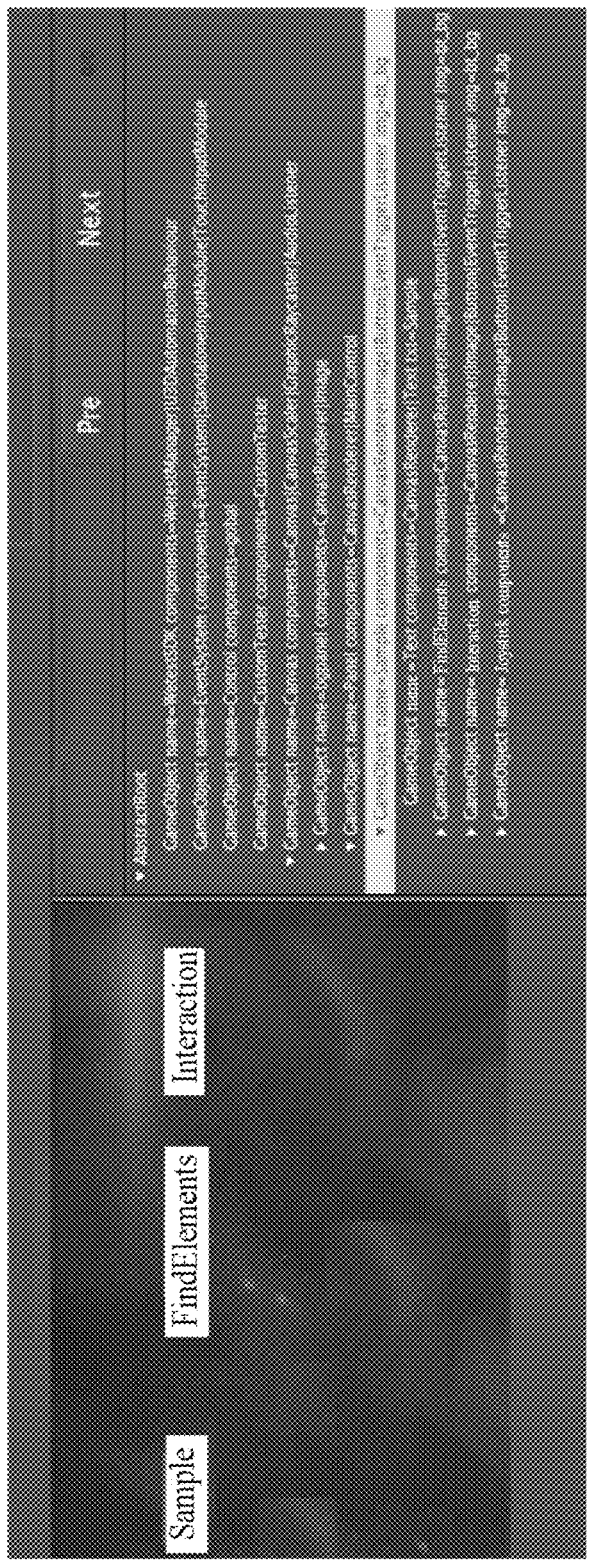
FIG. 2 is a schematic diagram illustrating a data presentation tool of a game script.

In addition, the test tool also provides a control viewer: View; as shown in FIG. 2. When a user manually writes a test script, this control viewer is used to actively "sync with the game" to obtain the current game screen and the control tree, and to write the script according to the obtained GameObject.

However, the above-mentioned automated testing method have the following disadvantages. On the one hand, the scope of application is small and the method is only applicable to Android-based games. On the other hand, the speed of obtaining control information is slow and the abstraction of the method is not enough. Especially when complicated conditions are given, stuck can be felt when the control is obtained. Because this test tool is only used for Android-based games, the controls are obtained according to the characteristics of Android-based games. For example, the controls are obtained according to the Component property, the text value, picture name, and so on. Furthermore, the coordinate system of the control is not flexible enough, and the global analog input can only use absolute coordinate values. However, if an absolute coordinate position is written in a test script, the results when the script is run on terminals with different resolutions will be different, which will cause the script to run abnormally. Furthermore, there are a relatively small number of ways to support analog input, only click, swipe, long press, text input (including keys) are supported, and multi-touch, forced screen rotation, gyroscope and the like which are more complicated are not supported. Further, auxiliary tools for generating scripts and logs are relatively simple and under-used; the UI data of the current screen cannot be presented to the user in real time, and efficiency for a user to write the script is low; and no detailed script running report is provided for the user, such as the equipment site when the script is run.

Figure 3:
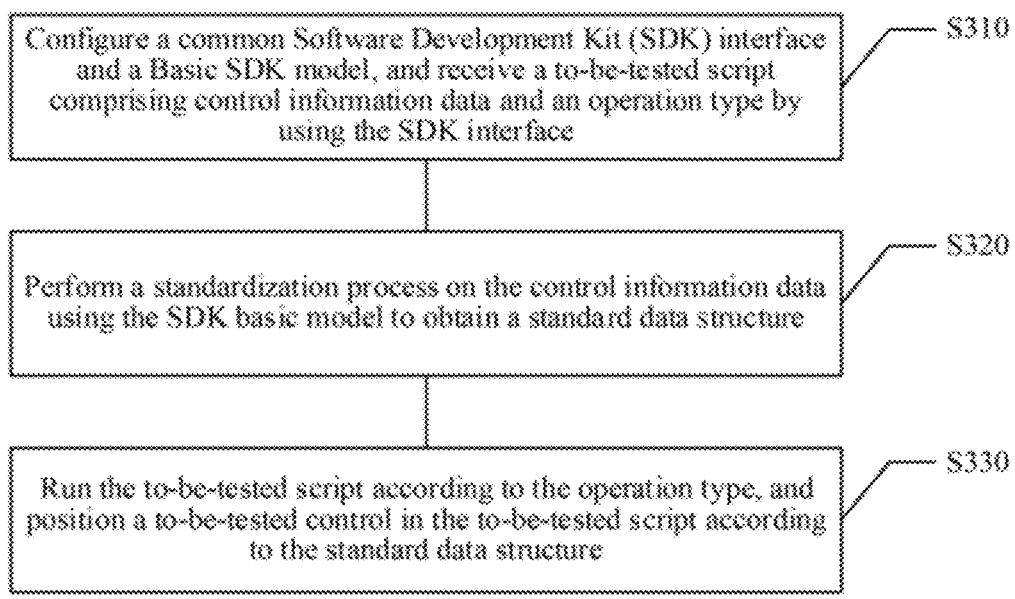
FIG. 3 is a flowchart illustrating an automated testing method.

An exemplary embodiment of the present disclosure provides an automated testing method. Referring to FIG. 3, the automated testing method may include the following steps.

In step S310, a common Software Development Kit (SDK) interface and a Basic SDK model are configured, and a to-be-tested script comprising control information data and an operation type is received by using the SDK interface.

In step S320, a standardization process is performed on the control information data using the SDK basic model to obtain a standard data structure.

In step S330, the to-be-tested script is run according to the operation type, and a to-be-tested control in the to-be-tested script is positioned according to the standard data structure.

In the automated testing method, on the one hand, the common SDK interface and a Basic SDK model are configured, and standardization process is performed on control information data to obtain standard data, and this method can address the problem in related art that the usage scope of each automated test framework is small due to different information data structures, and the application scope of the automated testing method is increased. On the other hand, a to-be-tested control in the to-be-tested script is positioned according to the standard data structure, thereby improving the positioning efficiency of the to-be-tested control, and accordingly improving the efficiency of automated testing.

Hereinafter, each step in the above-mentioned automated testing method according to exemplary embodiments will be explained in detail.

According to an aspect of the present disclosure, there is provided an automated testing method. The method include the following steps:

In step S310, a common Software Development Kit (SDK) interface and a Basic SDK model are configured, and a to-be-tested script comprising control information data and an operation type is received by using the SDK interface.

First, a basic SDK (Software Development Kit, which can include utility tools for debugging and other purposes) standard is configured. The SDK standard can include a common SDK interface and a basic SDK model. Further, according to the SDK standard, the SDK interface and the basic SDK model can be implemented correspondingly on different engines, and different programming languages may follow the same interface and model specifications to implement the SDK interface and the basic SDK model. What needs to be added here is that the SDK code needs to be incorporated in the game, and the automated framework obtains structured UI rendering data by communicating with the SDK. The SDK code is different for each engine, and the specific code is strictly in accordance with the model definition given in the present disclosure and the code is embedded in the game. The SDK is responsible for obtaining UI rendering data through the engine interface in the game and processing the standard data structure defined in the present disclosure.

Second, the basic SDK model may include AbstractNode (the abstract model for control nodes), AbstractDumper (the abstract model for control node traversal), Selector (the abstract model for control node positioning), and DefaultMatcher (the abstract model for default matching).

AbstractNode can contain a parent-child hierarchy access method and an attribute enumeration method. Further, through the parent-child hierarchy access interface method, all associated objects of the control node can be accessed to implement the traversal function. The interface method of attribute enumeration can obtain attributes of the node, such as the name, path, and text of the node, and so on.

AbstractDumper can implement the control node dump algorithm. Through iterative traversal, control node data and hierarchical relationships are exported according to a desired data format. The algorithm implementation can include the following steps. First, the hierarchy of all control nodes is a tree structure, and each node is of a type of AbstractNode. The root node is obtained, and the attribute enumeration interface method in the root node is used to obtain all the attributes of the node. Then, the parent-child hierarchy access method in the root node is used to obtain the child nodes directly under the node. If the number of child nodes is not zero, each child node is used as a root node, and the previous step is repeated, and the return value is stored. Finally, the root node information and child node information are organized according to a fixed format.

The Selector can implement a general Select algorithm based on the AbstractNode method. The Select algorithm refers to traversing all nodes and returning nodes that meet given conditions (multiple nodes may be returned). Further, the core steps of the Select algorithm are similar to the dump algorithm, and conditions are judged for nodes when controls are traversed (the method of the DefaultMatcher class will be used in the judgment). If a node meets the given conditions, the node will be added to the returned result.

The DefaultMatcher provides a default matching method, which is applied in the Select algorithm. The Select algorithm determines whether to include this node in the returned result according to the result obtained by the match.

Then, the SDK interface is used to receive a to-be-tested script including control information data and an operation type. By receiving the to-be-tested script through the SDK interface, the data structure of the to-be-tested script can be unified, the cross-engine test can be realized, and the applicable range of the automated testing method is widened. Further, it should be noted that the abstract model and abstract method in the above SDK standard can be called rules. In the implementation of specific rules, APIs provided by an engine are used to implement corresponding abstract methods, and these methods are encapsulated into rpc (remote procedure call) methods. After implementation, the interface for each test framework is the same when called. For each automated test framework, the SDKs of various engine versions have the same public rpc method which can be called, and the differences between the engines have been eliminated, thus achieving cross-engine test.

In step S320, a standardization process is performed on the control information data using the SDK basic model to obtain a standard data structure. The step of performing a standardization process on the control information data using the SDK basic model to obtain a standard data structure, comprises: dumping control node data and control node hierarchy of the control information data according to a preset data format using the abstract model for control node dump, so as to obtain the standard data structure.

First, the root node of the control information data is obtained, and all the attributes of the node are obtained by an attribute enumeration interface method in the root node. Then, the child nodes directly originated from the node are obtained through a parent-child hierarchy access method in the root node. If the number of child nodes is not zero, then each child node is regarded as a root node in turn, and the previous steps are repeated, and the return values are stored. Finally, the root node information and child node information are organized according to a fixed format and the root node information and the child node information are dumped to obtain the standard data structure. Further, the standard data structure of the control information data may be as follows:

```
# name can be duplicated from the original name or just left the
default one
    # if it cannot be determined, however providing some
    meaningful name is preferred
    'name': '<a recognizable string>'
    # All available attributes of this node are in form of key-value
    pairs
    'payload': {
        'name': '',
        'pos': [0, 0],
        'size': [1, 1],
        ...
    },
    # If there is no child, this part can be omitted
    'children': [
        {...},   # Same structure as this dict.
    ],
}
```

The above data is generated by the dump method in AbstractDumper. In each programming language, it is easy to convert the data structure in the language into ison. Further, when generating data, you can filter the data as needed. For example, a control generally has a "Visible"

attribute to indicate whether the control is visible, so when generating data, you can discard an invisible control to save the amount of data processing, and thereby improve the operating efficiency of the framework.

Figure 4:
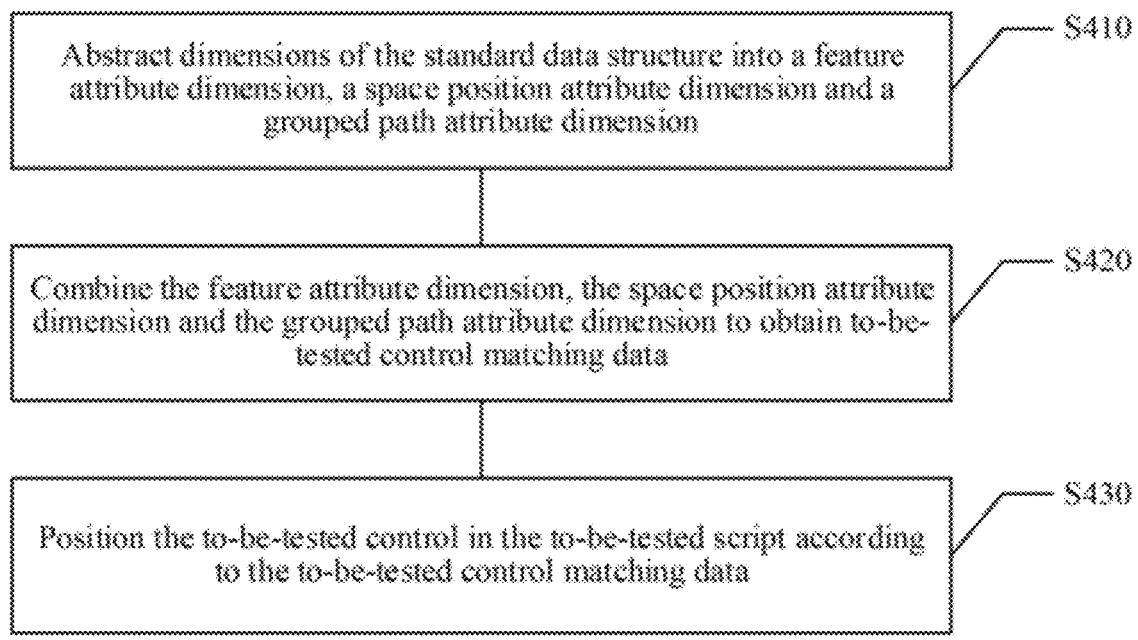
FIG. 4 is a flowchart illustrating a method for positioning a to-be-tested control in a to-be-tested script according to a standard data structure.

In step S330, the to-be-tested script is run according to the operation type, and a to-be-tested control in the to-be-tested script is positioned according to the standard data structure. Referring to FIG. 4, the step of positioning a to-be-tested control in the to-be-tested script according to the standard data structure may include steps S410 to S430.

In step S410, dimensions of the standard data structure are abstracted into a feature attribute dimension, a space position attribute dimension and a grouped path attribute dimension.

Since each standard data structure includes multiple serializable attributes (such as name, path, text, etc.), and each standard data structure can be organized according to a rendering hierarchy in an engine. Therefore, the standard data structure may be abstracted into three dimensions: attribute dimension, hierarchy dimension, and space position dimension. Attributes can be the characteristics of the standard data structure, and can be used to describe the nature, style, and behavior of the standard data structure. The space position is actually a kind of attribute. The hierarchy may be grouped paths.

In step S420, the feature attribute dimension, the space position attribute dimension and the grouped path attribute dimension are combined to obtain to-be-tested control matching data.

The above-mentioned random combination may include logical AND (logical conjunction), logical OR (logical disjunction), and logical NOT (logical negation), and may also include other combination methods, such as XOR, and so on. Embodiments of the present disclosure do not impose specific limitations on this. For example, you can choose a standard data structure named "A" and a direct sub-data structure with a text value of "B"; or, you can select a sub-control of a control named "A", where the sub-control has a descendant type of "Button" and the space arrangement is the third sub-control from left to right; further, you may select the standard data structure with name "A" and type "Button"; or, you may select the standard data structure with name "A" or type other than "Image". Embodiments of the present disclosure do not impose specific limitations on this. When the random combination is completed, the data obtained by the random combination is used as the matching data of the control to be tested. For example, a standard data structure named "A" or having a type other than "Image" can be used as the matching data of the control to be tested.

In step S430, the to-be-tested control in the to-be-tested script is positioned according to the to-be-tested control matching data. The step of positioning the to-be-tested control in the to-be-tested script according to the to-be-tested control matching data may include steps S3202 and step S4304.

In step S4302, to-be-tested software corresponding to the to-be-tested script is traversed according to the to-be-tested control matching data.

The software to be tested includes multiple scripts to be tested and multiple controls to be tested. In order to quickly find the target control to be tested, the target control to be tested needs to be located. Therefore, in order to quickly locate the target control to be tested, it is necessary to quickly traverse the controls to be tested in the entire test software. Further, according to the above abstract definition of the control to be tested, if the selection condition is complicated (for example, it includes multiple hierarchical relationships), the number of traversals will be more. Therefore, in the test scenarios of terminal games, due to the limitations of terminal performance, overly complex traversal can be transferred to the server for execution, that is, to run on the server where the test framework is located. When traversing on the host, dumpHierarchy is performed on the game, that is, the relevant control data in the terminal is extracted to the server. Because the traversal speed on the host is faster, the main overhead of the overall time is the dumpHierarchy in the game.

The specific location of the traversal will be explained and explained below. Whether the traversing is performed on the terminal or the server can be determined depending on the traversal hierarchy. For example, when the traversal hierarchy exceeds a certain preset value (for example, it can be greater than 2 or 3 layers), traversal can be performed on the server; when the traversal hierarchy does not exceed the above preset value, the traversing can be performed directly on the terminal. The traversing on the server can specifically include the following steps. First, dumpHierarchy (extracting the relevant control data in the terminal to the server) is performed. Second, traverse is performed on the server to obtain the target control to be tested. Finally, interactive operation is performed by the control to be tested. The traversing on the terminal may specifically include the following steps. First, traversing is performed on the terminal to obtain the target control to be tested. Second, the coordinate information of the target control to be tested is obtained, and interactive operations are performed.

Next, the above traversal method is explained. Traversing on the server or traversing on the terminal needs to be conducted in accordance with a common traversing method. The general traversing method can specifically include the following steps. First, it is assumed that the automation framework runs on a PC, and the SDK runs in the game. The select algorithm in the Selector in the SDK runs in the game, and its interactive object is AbstractNode in the game. Because of the layer structure of AbstractNode, the select algorithm can be directly migrated to the PC, and AbstractNode corresponds to a virtual node (only data) on the PC. Therefore, the select algorithm on the PC is essentially a search operation for structured data. The following is an AbstractNode implementation on a PC based on the standard control information data structure. First, the parent-child hierarchy access method is as follows: in Step 1, when the parent level loads the data, a pointer is added to each item in the children field to point to itself, and when the parent node is later accessed, the pointer is directly accessed and returned; in Step 2, the sub-level directly returns the children field in the data structure. Second, the attribute enumeration method is as follows: directly looking up the payload field in the data structure. Further, obtaining data sources for AbstractNode on the PC may include the following steps. First, AbstractDumper is used to conduct dumpHierarchy in the SDK to obtain structured data (json format or xml) of all the controls in the current interface; second, the data is transferred to the automation framework on the PC and the data is associated to the AbstractNode on the PC one by one.

It should be noted that running the select algorithm on the PC can greatly improve the speed of searching uncer complex conditions; however, under simple conditions, it is still slightly faster to run directly in the game. Therefore, in actual implementation, if the search condition exceeds 2 layers (e.g., all nodes satisfying a condition 1 and all descendants are regarded as search nodes, then search is performed according to a condition 2), then the select algorithm may be run on the PC; otherwise, the select algorithm may be run directly in the game.

In step S4304, the to-be-tested control which complies with the to-be-tested control matching data is returned according to a traverse result.

Figure 5:
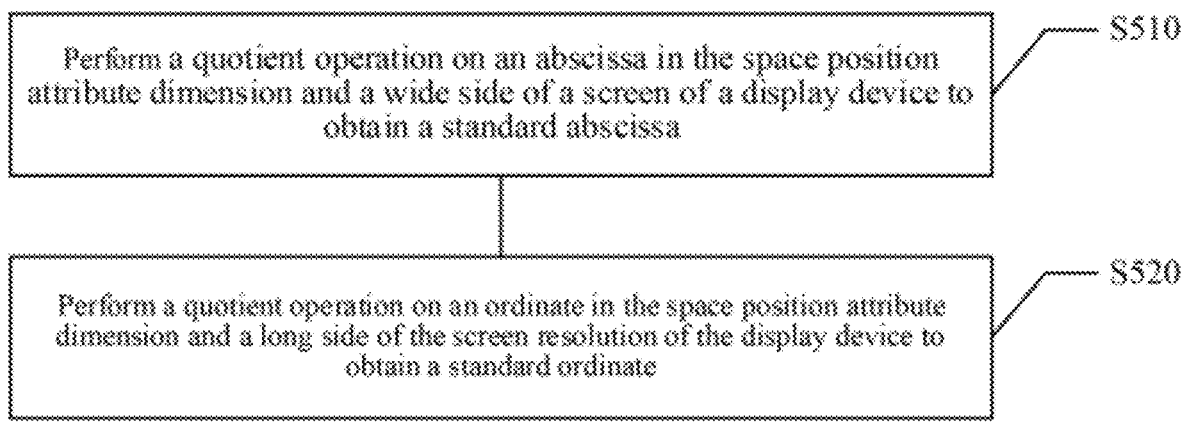
FIG. 5 is a flowchart showing a method for normalizing control position attribute dimension.

In order to unify the coordinate systems of devices with different resolutions, the space position attribute dimension can be normalized. The normalization process can be the coordinate value of the control position attribute dimension relative to the screen percentage of the display device. Referring to FIG. 5, normalizing the control position attribute dimension may include step S510 and step S520.

In step S510, a quotient operation is performed on an abscissa in the space position attribute dimension and a wide side of a screen of a display device to obtain a standard abscissa.

In step S520, a quotient operation is performed on an ordinate in the space position attribute dimension and a long side of the screen resolution of the display device to obtain a standard ordinate.

The steps S510 and S520 will be explained with the following examples. For example, the abscissa (x value) in the space position attribute dimension can be divided by the width of the screen of the display device to obtain the standard abscissa the ordinate in the space position attribute dimension (y value) be divided by the long side (height) of the display device to obtain the standard ordinate. In this way, the standard abscissa and the standard ordinate are percentage values relative to the screen of the display device, and the standard abscissa and the standard ordinate can be applied to displays of different sizes. Accordingly, for devices with different resolutions, the percentage value is unchanged.

Further, in order to allow interactive operation on the to-be-tested control, an analog input interface may be configured. The automated testing method according to an embodiment may further include: configuring an analog input interface; using the analog input interface to receive a touch operation, and controlling the to-be-tested control according to the touch operation.

First, an analog input interface is configured. Second, a touch operation is received using the analog input interface, and the to-be-tested control is controlled according to the touch operation (to achieve interactive operation with the to-be-tested). The touch operation may include the following operations. MotionEvent: all screen touch-related operations, each touch point has three actions, i.e., pressing, moving, and lifting. Performing operations on multiple points is multi-touch, and the event set of all points is MotionEvent. KeyEvent refers to a key event corresponding to keyboard, HOME, BACK, and so on. There are two actions: pressing and lifting, similarly to MotionEvent. SensorEvent refers to a sensor event which simulates setting of a sensor value, and so on. Further, since most game engines do not provide the function of analog input, because the engines themselves do not use the analog input and there are some security issues to prevent games from being used by plug-ins. Embodiments of the present disclosure provide an analog input interface. If an engine can support analog input, the interface can be implemented. If the engine cannot support analog input, the analog input method provided by the operating system may be used.

Furthermore, in order to present the UI data of the current screen to the user during the interactive operation of the to-be-tested control and the test log of the to-be-tested script, a script writing assistance tool may be configured. According to an embodiment of the present disclosure, the automated testing method may further include: configuring a script writing assistance tool, and generating a log corresponding to the to-be-tested script using the script writing assistance tool.

In an integrated UI automation test framework, real-time UI data can be obtained from the SDK module in the game through rpc communication, and data filtering and analysis and UI rendering tree presentation are performed, and a corresponding UI control can be positioned in real time by moving a mouse on a device screen. The lock of the control is positioned according to the Z-order of the control. The Z-order is the stacking order of the control rendering. For example, a top to-be-rendered control will have a larger Z-order (in some other systems, a top to-be-rendered control will have a smaller Z-order). When multiple controls are rendered in the same position, the control with the largest Z-order will cover the screen of the control with the smaller Z-order. Further, the above-mentioned automated testing framework may include an inspector mode and an automatic recording mode.

Figure 6:
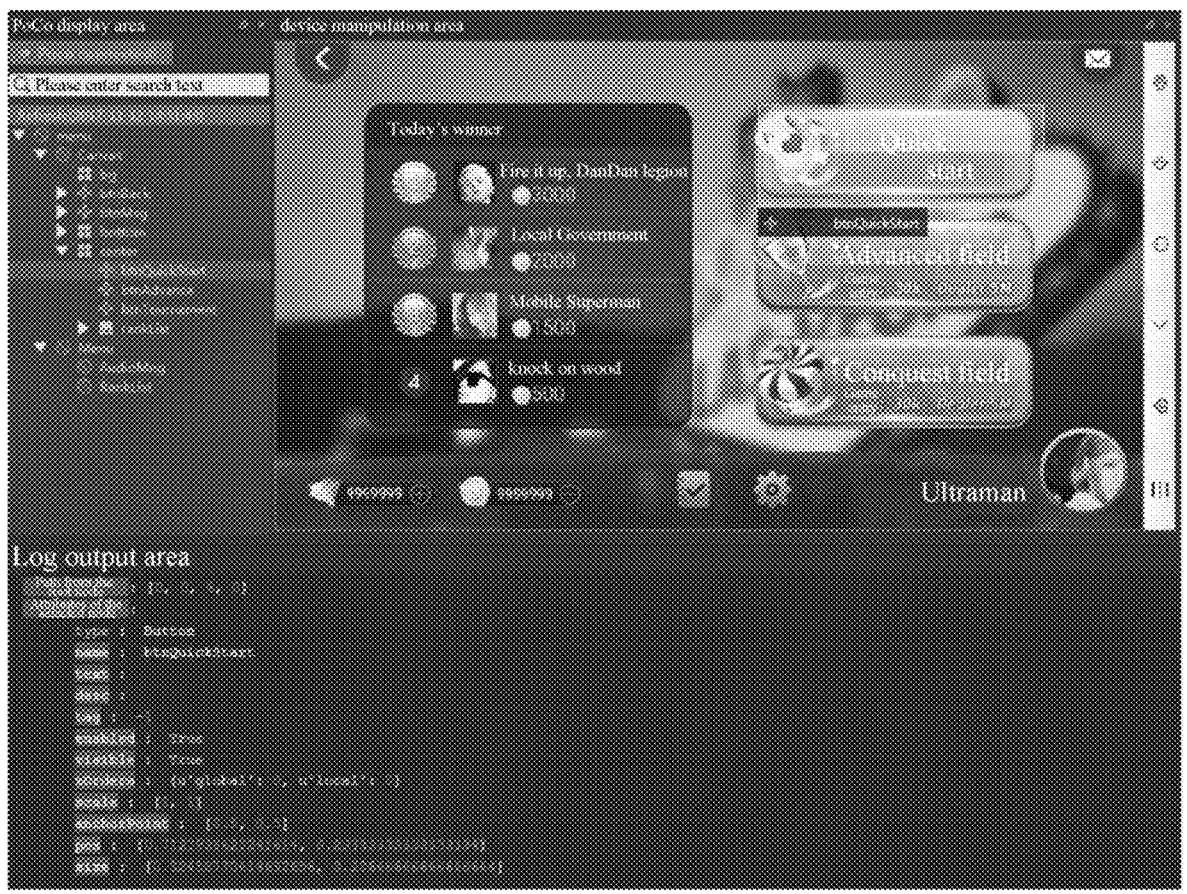
FIG. 6 is a schematic diagram illustrating the working principle of an automated test framework.
Figure 7:
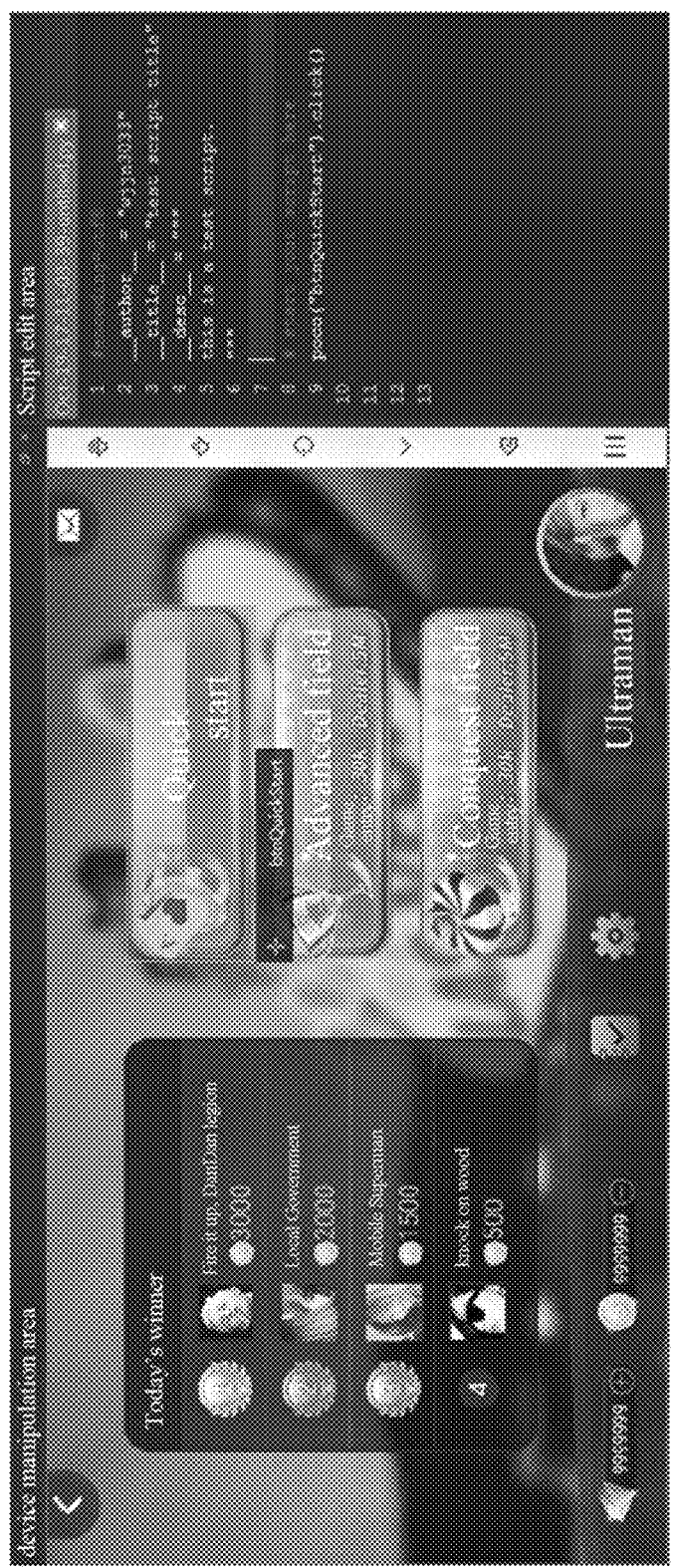
FIG. 7 is a schematic diagram illustrating an automatic recording mode.

For example, when a user selects the inspector mode, the device screen and the UI data are frozen. When the user moves the mouse in the device screen, the control box at the corresponding position is automatically circled in the form of a transparent frame, and a comment box is added around the transparent box. The comment box includes the icon, control type, control name and other properties corresponding to the control (for a specific effect, refer to FIG. 6). The position of the comment box is preferentially left-aligned below the transparent box. In order to ensure the display inside the device screen, the automated test framework calculates the width and height of the comment box. If the position below the transparent box is not enough, the comment box is moved to the upper left-aligned position. Further, if it is found that the right side of the transparent box goes beyond the device area when the comment box is left-aligned with the transparent box the comment box is shifted to the left until the comment box is flush with the device area. Further, referring to FIG. 7, in the automated test framework, when an entry in the tree structure on the left is selected, the right device screen displays the selection effect of the transparent box of the corresponding control. Also, when the user slides in the device area with the mouse and clicks or taps on a control, the corresponding control entry in the tree structure diagram on the left will show the selected effect. If the expanded list of the tree diagram is too long, the tree diagram will automatically scroll to the corresponding control. When the user selects a control, all attributes corresponding to the control will be displayed in the output window, which can be used when the user writes the script.

When the user selects the automatic recording mode, the device screen and the UI data will be refreshed normally. When the user moves the mouse in the device screen, the range of the control at the corresponding position is automatically circled in the form of a transparent frame and a comment box is added around the transparent box. The comment box includes attributes of the control such as the icon, the control type, the control name and so on. When a user performs an operation on the device, a corresponding operation script is automatically generated in the script area. When the user performs an operation, the UI data is continuously refreshed. If the device space interface changes, the user can continue to a next operation, and AirtestIDE automatically generates the script until the user completes the operation and ends the script recording. After writing the test script in the UI automated framework, the user can click to run directly. After the running is finished, the log generated by the script can be viewed with one click or tap. Further, during running, device screenshots, operation positions, and control information corresponding to the operation can be saved. When generating a report, the recorded running data is be generated into an HTML web page, and according to the operation sequence, device screenshots, positions of the operated controls, and sizes of the operated controls are circled with corresponding marks. The specific results can be shown in FIG. 8.

Further, the working principle of the above automated testing framework is explained. The above script writing assistance tool obtains the real-time UI rendering data of the current game client from the integrated SDK in the game through the integrated IA automation framework, and presents the relevant data to the user of the script writing assistance tool. The script writing assistance tool finds the UI control algorithm by location, and integrates the UI positioning following the movement of the mouse. In the automatic recording mode, the user's operation on the mobile phone can be determined according to the operation (press-up, press-move-lift) of the mouse on the mapped screen, and according to the extracted operation control information, UI automation test script is generated. After the user generates the script, he can debug and run the test script, and view the log to complete the writing of the test script.

Furthermore, in order to realize the communication between the terminal and the server, a communication connection may be established between the terminal and the server. The game and the test framework are run on different machines (different processes), so communication between them is indispensable. The communication method can include network, file, pipes, etc. Not all games have a corresponding server, or not all games can perform network communication. Thus, it is necessary to support various communication methods. The communication in the disclosure is based on interface calls, that is, based on the rpc model. In the SDK embedded in the game, requests from the testing framework will be always listened, and the receiving range includes networks, files, pipes, and so on. The format of these requests is negotiated by both ends (sdk and the test framework). One request corresponds to one rpc method call and the call result is returned along the original path. The script writing rules are unified across engines and platforms.

The technical effects which can be achieved by the technical solutions according to embodiments may include but are not limited to the following aspects:

First, the methods provided by embodiments of the present disclosure can be used across engines and platforms. Developers can use the technical solutions in different types of projects, and algorithms written by the developers themselves can be easily migrated and used. Secondly, the general HierarchyViewer is used for viewing interface control hierarchy and attributes. Because the standard control information data structure is defined, the control information can be re-annotated based on the determined rules, for example, being displayed in software, and developers can use the software to view the control information of the application or write a test script. Again, the normalized coordinate system facilitates script maintenance and improves readability. Normalized coordinates can be used to immediately know the approximate position of the control, for example, whether the control is in the left or right or in the middle. If the same test script uses an interactive operation of a specific coordinate, the coordinate can be used under resolutions. Further, the input and output are decoupled. The control information output from the engine can be used for input in other ways. For example, a robot arm may be used, and sizes can be converted to sizes in real scenes to control the robot arm. For some game engines, there is a design resolution setting, and the coordinates and sizes of all controls are determined based on the design resolution. The design resolution is a fixed value set by the game developer. When the design resolution is different from the screen resolution, the game engine will do a coordinate mapping. The coordinate value of the control is not the coordinate on the screen. Further, convenient related tools are provided to improve the ease of use. Through function integration, users can use the UI automation test framework in the present disclosure to quickly generate test scripts, and debug the scripts, view report, and the like. This can greatly reduce the burden in usage. Also, multiple test frameworks can be used at the same time: users can mix scripts, that is, the same test script may include image recognition scripts and automation framework scripts, and this can effectively combine the advantages of the two frameworks. Finally, the alternative communication mode is provided. The test framework can communicate with the game SDK in many ways. For example, a server on the SDK side may be started, a client on the test framework side may be started, the client sends a request to the server, and the server returns a corresponding result. The communication method can be replaced with the rest of the rpc framework, which is suitable for scenarios that are not suitable for starting the server on the SDK side. Other methods such as files, pipes, or the like can be used, without communicating through the network.

Figure 8:
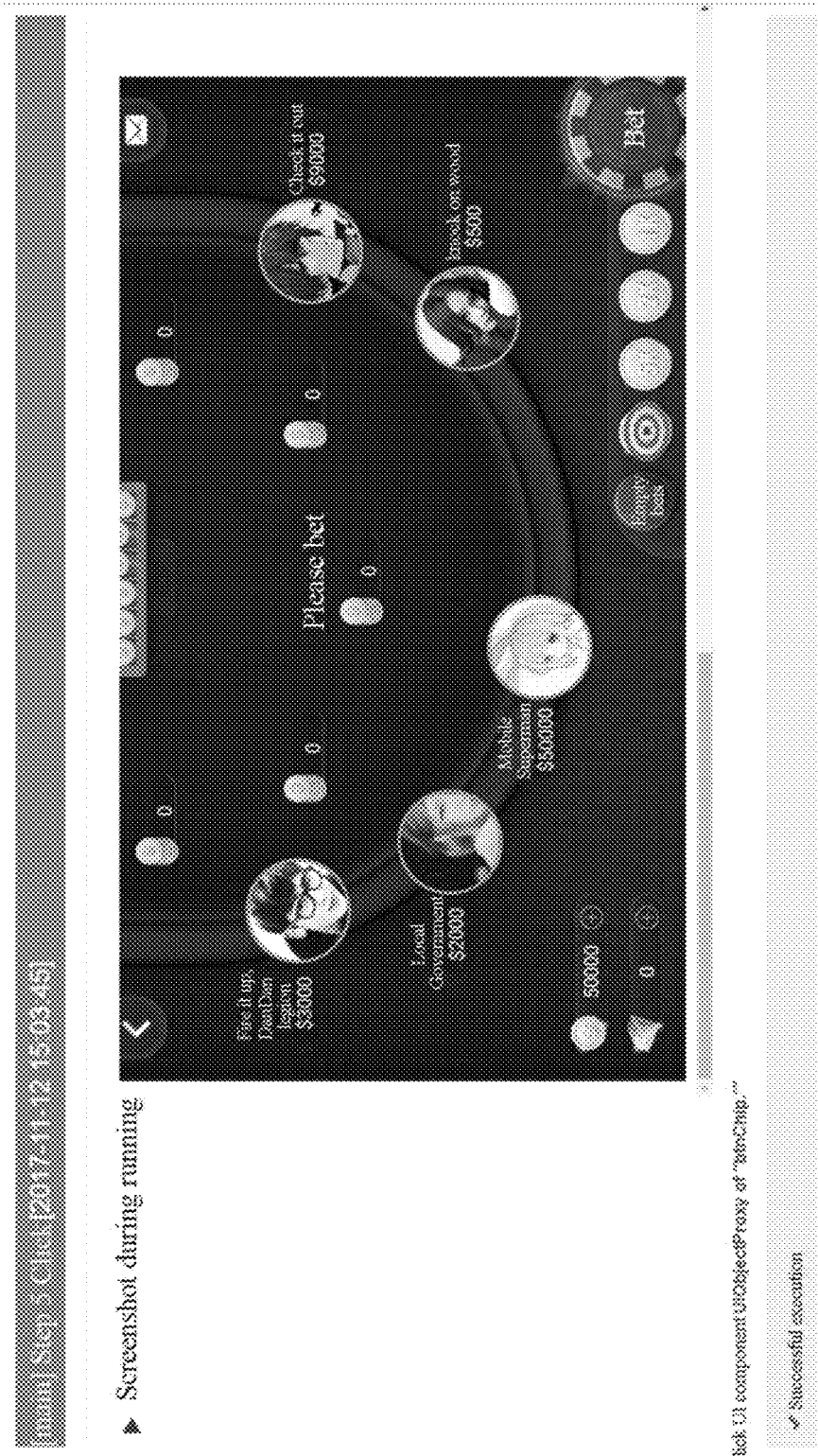
FIG. 8 is a schematic diagram illustrating an example of an operation report.
Figure 9:
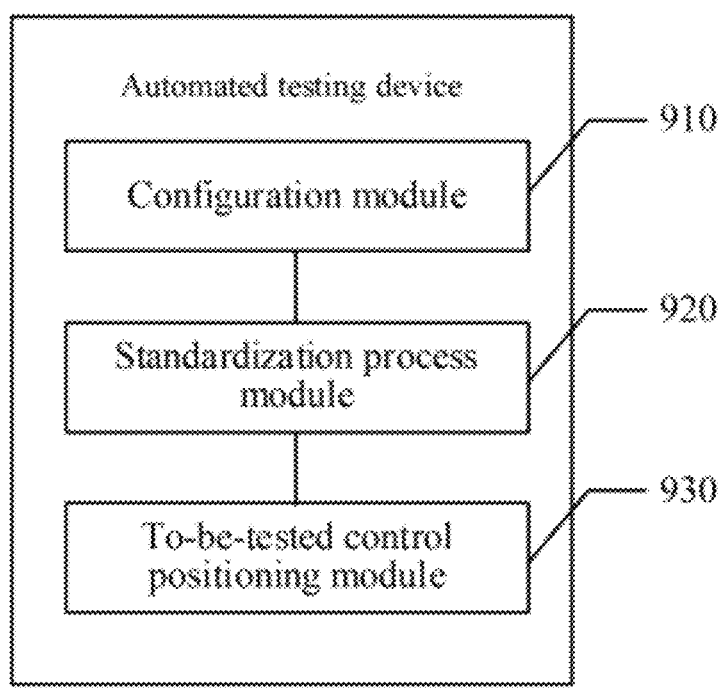
FIG. 9 is a block diagram illustrating an automated testing device.

An embodiment of the present disclosure also provides an automated testing device. As shown in FIG. 8, the automated testing device may include a configuration module 910, a standardization process module 920 and a to-be-tested control positioning module 930.

The configuration module 910 is configured to configure a common Software Development Kit (SDK) interface and a Basic SDK model, and receiving a to-be-tested script comprising control information data and an operation type by using the SDK interface.

The standardization process module 920 is configured to perform a standardization process on the control information data using the SDK basic model to obtain a standard data structure.

The to-be-tested control positioning module 930 is configured to run the to-be-tested script according to the operation type, and position a to-be-tested control in the to-be-tested script according to the standard data structure.

Details regarding the exemplary embodiments of automated testing device can be found in the above descriptions regarding the method embodiments, and repeated descriptions are omitted here.

It should be noted that although several modules or units of the devices for action execution are described above, such division is not mandatory. In fact, according to the embodiments of the present disclosure, the features and functions of two or more modules or units described above may be embodied in one module or unit. Conversely, the features and functions of a module or unit described above can be further divided into multiple modules or units.

Furthermore, although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

Through the description of the foregoing embodiments, those skilled in the art can easily understand that the exemplary embodiments described herein can be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, and so on) or on a network. The software product may include instructions to cause a computing device (which may be a personal computer, a server, a mobile terminal, or a network device, and so on) to perform methods according to embodiments of the present disclosure.

An exemplary embodiment of the present disclosure also provides an electronic device capable of implementing the above methods.

Those skilled in the art can understand that various aspects of the present disclosure may be implemented as a system, method, or program product. Therefore, various aspects of the present disclosure can be embodied in the following forms: a complete hardware implementation, a complete software implementation (including firmware, microcode, etc.), or a combination of hardware and software, which can be collectively referred to as "circuit", "module", or "system".

An electronic device 1000 according to an exemplary embodiment of the present disclosure is described below with reference to FIG. 10. The electronic device 1000 shown in FIG. 10 is only an example, and should not impose any limitation on the functions and scope of use of the embodiments of the present disclosure.

Figure 10:
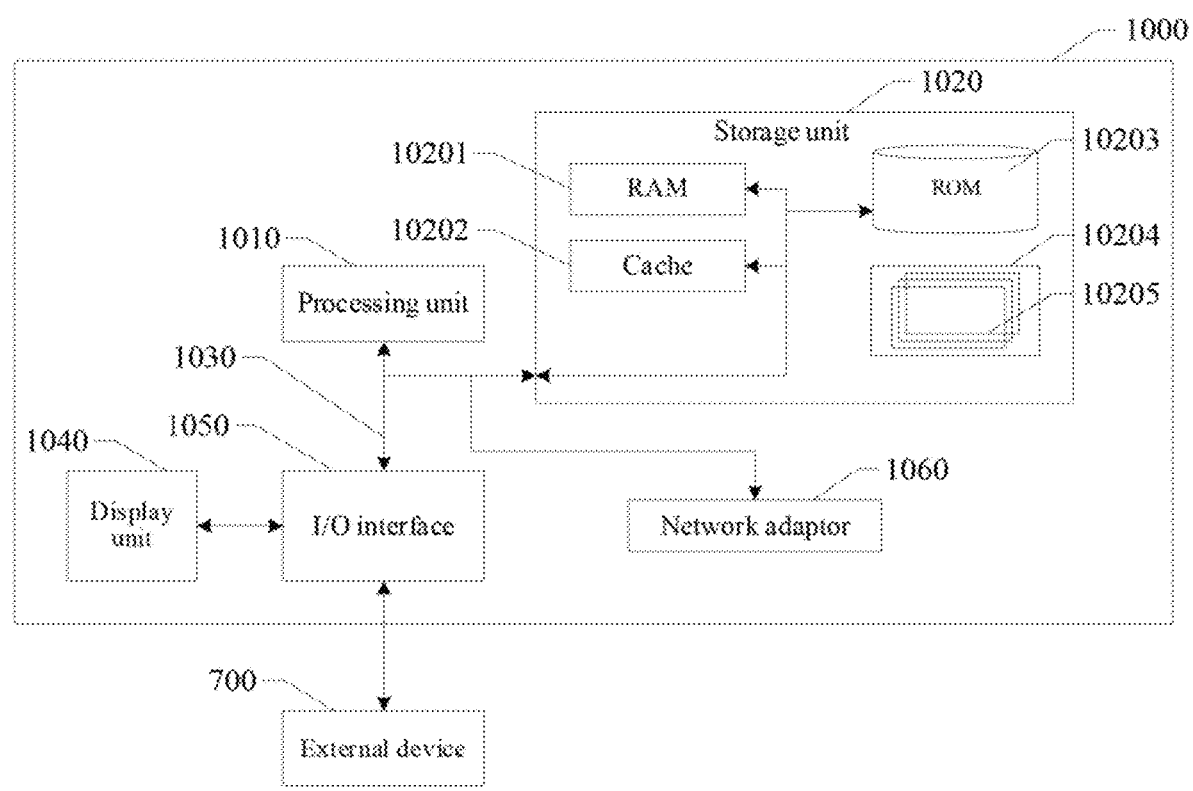
FIG. 10 is a block diagram illustrating an electronic device for implementing the above-mentioned automated testing methods.

As shown in FIG. 10, the electronic device 1000 is shown in the form of a general-purpose computing device. The components of the electronic device 1000 may include, but are not limited to, at least one processing unit 1010, at least one storage unit 1020, and a bus 1030 connecting different system components (including the storage unit 1020 and the processing unit 1010).

The storage unit stores program codes, and the program codes can be executed by the processing unit 910, so that the processing unit 1010 executes various exemplary embodiments according to the present disclosure described in the "exemplary methods" section of the present specification. For example, the processing unit 1010 may perform the steps shown in FIG. 3. In step S310, a common Software Development Kit (SDK) interface and a Basic SDK model are configured, and a to-be-tested script comprising control information data and an operation type is received by using the SDK interface. In S320, a standardization process is performed on the control information data using the SDK basic model to obtain a standard data structure. In S330, the to-be-tested script is run according to the operation type, and a to-be-tested control in the to-be-tested script is positioned according to the standard data structure.

The storage unit 1020 may include a readable medium in the form of a volatile storage unit, such as a random access storage unit (RAM 10201 and/or a cache storage unit 10202, and may further include a read-only storage unit (ROM) 10203.

The storage unit 1020 may further include a program/utility tool 10204 having a set (at least one) of program modules 10205. Such program modules 10205 include, but are not limited to, an operating system, one or more application programs, other program modules, and program data. Each or some combination of these examples may include an implementation of a network environment.

The bus 1030 may be one or more of several types of bus structures, including a memory unit bus or a memory unit controller, a peripheral bus, a graphics acceleration port, a processing unit, or a local area bus using any bus structure in a variety of bus structures.

The electronic device 1000 may also communicate with one or more external devices 700 (such as a keyboard, a pointing device, a Bluetooth device, etc.), and may also communicate with one or more devices that enable a user to interact with the electronic device 1000, and/or may also communicate with any device (such as a router, a modem) that can enable the electronic device 900 to interact with one or more other computing devices. Such communication can be performed through an input/output (I/O) interface 1050. Moreover, the electronic device 1000 may also communicate with one or more networks (such as a local area network (LAN), a wide area network (WAN), and/or a public network, such as the Internet) through the network adapter 1060. As shown in the figure, the network adapter 1060 communicates with other modules of the electronic device 1000 through the bus 1030. It should be understood that although not shown in the figure, other hardware and/or software modules may be used in conjunction with the electronic device 1000, including but not limited to: microcode, device drivers, redundant processing units, external disk drive arrays, RAM systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to exemplary embodiments of the present disclosure.

An exemplary embodiment of the present disclosure also provides a computer-readable storage medium having stored thereon a program product capable of implementing the above methods according to embodiments of the present disclosure. In some possible implementations, aspects of the present disclosure may also be implemented in the form of a program product, which includes program codes. When the program product is run on a terminal device, the program codes are used to cause the terminal device to perform the steps according to various exemplary embodiments of the present disclosure described in the above-mentioned exemplary methods.

Figure 11:
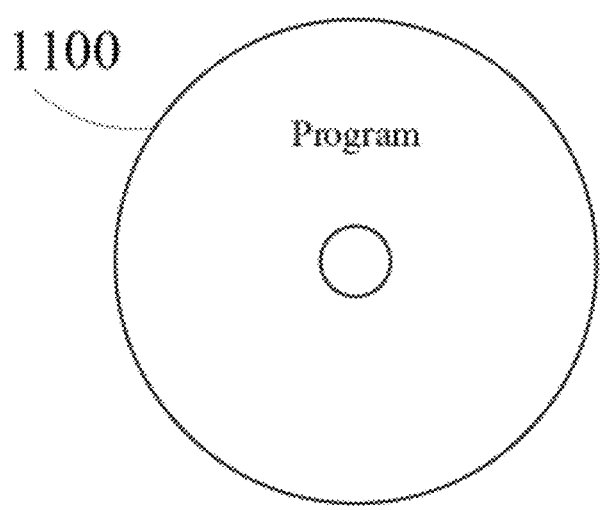
FIG. 11 illustrates a computer-readable storage medium for implementing the above-mentioned automated testing methods.

FIG. 11 shows a program product 1100 for implementing the above methods according to an exemplary embodiment of the present disclosure. The program product 1100 may be stored by a portable compact disc read-only memory (CD-ROM) and include program codes, and may be executed on a terminal device, such as a personal computer. However, the program product of the present disclosure is not limited thereto. The readable storage medium may be any tangible medium containing or storing a program, and the program may be used by an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet provided by the Internet service providers.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. An automated testing method, comprising:
   configuring, by a game client, a common Software Development Kit (SDK) interface and a Basic SDK model, the Basic SDK model configured to listen to a request from a test framework for establishing a communication between the game client and the test framework,
   receiving a to-be-tested script comprising control information data and an operation type from the test framework by using the SDK interface;
   performing, by the game client, a standardization process on the control information data using the SDK basic model to obtain a standard data structure;
   running, by the game client, the to-be-tested script according to the operation type;
   abstracting, by the game client, dimensions of the standard data structure into a feature attribute dimension, a space position attribute dimension and a hierarchy attribute dimension for organizing the standard data structure;
   combining, by the game client, the feature attribute dimension, the space position attribute dimension and the hierarchy attribute dimension to obtain to-be-tested control matching data; and
   positioning, by the game client, a to-be-tested control in the to-be-tested script according to the to-be-tested control matching data, or, sending, by the game client, the control information data to a server where the test framework is located for the server positioning the to-be-tested control in the to-be-tested script.

2. The automated testing method according to claim 1, wherein the Basic SDK model comprises at least two of an abstract model for a control node, an abstract model for control node dump, an abstract model for control node positioning and an abstract model for default matching.

3. The automated testing method according to claim 2, wherein performing, by the first device, a standardization process on the control information data using the SDK basic model to obtain a standard data structure, comprises:
   dumping, by the first device, control node data and control node hierarchy of the control information data according to a preset data format using the abstract model for control node dump to obtain the standard data structure.

4. The automated testing method according to claim 1, wherein the feature attribute dimension, the space position attribute dimension and the hierarchy attribute dimension are combined in a combination manner which comprises one or more of logical conjunction, logical disjunction, and logical negation.

5. The automated testing method according to claim 1, wherein after the feature attribute dimension, the space position attribute dimension and the hierarchy attribute dimension are combined to obtain the to-be-tested control matching data, the automated testing method further comprises:
   normalizing, by the first device, the space position attribute dimension.

6. The automated testing method according to claim 5, wherein normalizing, by the first device, the space position attribute dimension, comprises:
   performing, by the first device, a quotient operation on an abscissa in the space position attribute dimension and a width value of a screen of a display device to obtain a standard abscissa; and performing, by the first device, a quotient operation on an ordinate in the space position attribute dimension and a height value of the screen of the display device to obtain a standard ordinate.

7. The automated testing method according to claim 1, wherein positioning, by the first device, the to-be-tested control in the to-be-tested script according to the to-be-tested control matching data comprises:
traversing, by the first device, to-be-tested software corresponding to the to-be-tested script according to the to-be-tested control matching data; and
returning, by the first device, the to-be-tested control which complies with the to-be-tested control matching data according to a traverse result.

8. The automated testing method according to claim 1, further comprising:
configuring, by the first device, an analog input interface; and
receiving, by the first device, a touch operation using the analog input interface, and controlling the to-be-tested control according to the touch operation.

9. The automated testing method according to claim 1, further comprising:
configuring, by the first device, a script writing assistance tool, and generating a log corresponding to the to-be-tested script using the script writing assistance tool.

10. A computer-readable storage medium in a game client having stored thereon computer programs which, when executed by a processor, implement an automated testing method, comprising:
configuring a common Software Development Kit (SDK) interface and a Basic SDK model, the Basic SDK model configured to listen to a request from a test framework for establishing a communication between the game client and the test framework,
receiving a to-be-tested script comprising control information data and an operation type from the test framework by using the SDK interface;
performing a standardization process on the control information data using the SDK basic model to obtain a standard data structure;
running the to-be-tested script according to the operation type;
abstracting dimensions of the standard data structure into a feature attribute dimension, a space position attribute dimension and a hierarchy attribute dimension for organizing the standard data structure;
combining the feature attribute dimension, the space position attribute dimension and the hierarchy attribute dimension to obtain to-be-tested control matching data; and
positioning a to-be-tested control in the to-be-tested script according to the to-be-tested control matching data, or, sending the control information data to a server where the test framework is located for the server positioning the to-be-tested control in the to-be-tested script.

11. The computer-readable storage medium according to claim 10, wherein the Basic SDK model comprises at least two of an abstract model for a control node, an abstract model for control node dump, an abstract model for control node positioning and an abstract model for default matching.

12. The computer-readable storage medium according to claim 11, wherein performing a standardization process on the control information data using the SDK basic model to obtain a standard data structure, comprises:
dumping control node data and control node hierarchy of the control information data according to a preset data format using the abstract model for control node dump, so as to obtain the standard data structure.

13. The computer-readable storage medium according to claim 10, wherein the feature attribute dimension, the space position attribute dimension and the hierarchy attribute dimension are combined in a combination manner which comprises one or more of logical conjunction, logical disjunction, and logical negation.

14. The computer-readable storage medium according to claim 10, wherein after the feature attribute dimension, the space position attribute dimension and the hierarchy attribute dimension are combined to obtain the to-be-tested control matching data, the automated testing method further comprises:
normalizing the space position attribute dimension.

15. The computer-readable storage medium according to claim 14, wherein normalizing the space position attribute dimension, comprises:
performing a quotient operation on an abscissa in the space position attribute dimension and a width value of a screen of a display device to obtain a standard abscissa; and
performing a quotient operation on an ordinate in the space position attribute dimension and a height value of the screen of the display device to obtain a standard ordinate.

16. The computer-readable storage medium according to claim 10, wherein positioning the to-be-tested control in the to-be-tested script according to the to-be-tested control matching data comprises:
traversing to-be-tested software corresponding to the to-be-tested script according to the to-be-tested control matching data; and
returning the to-be-tested control which complies with the to-be-tested control matching data according to a traverse result.

17. The computer-readable storage medium according to claim 10, wherein the automated testing method further comprises:
configuring an analog input interface; and
receiving a touch operation using the analog input interface, and controlling the to-be-tested control according to the touch operation.

18. A game client, comprising:
a processor; and
a memory for storing instructions executable by the processor;
wherein when the instructions are executed by the processor, the processor is caused to:
configure a common Software Development Kit (SDK) interface and a Basic SDK model, the Basic SDK model configured to listen to a request from a test framework for establishing a communication between the game client and the test framework,
receive a to-be-tested script comprising control information data and an operation type from the test framework by using the SDK interface;
perform a standardization process on the control information data using the SDK basic model to obtain a standard data structure;
run the to-be-tested script according to the operation type;
abstract dimensions of the standard data structure into a feature attribute dimension, a space position attribute dimension and a hierarchy attribute dimension for organizing the standard data structure;

combine the feature attribute dimension, the space position attribute dimension and the hierarchy attribute dimension to obtain to-be-tested control matching data; and position a to-be-tested control in the to-be-tested script according to the to-be-tested control matching data, or, send the control information data to a server where the test framework is located for the server positioning the to-be-tested control in the to-be-tested script.

* * * * *